Aug. 16, 1932.  D. W. SMITH  1,871,755
PIE SEPARATING AND TRIMMING MECHANISM
Filed July 15, 1931  2 Sheets-Sheet 1
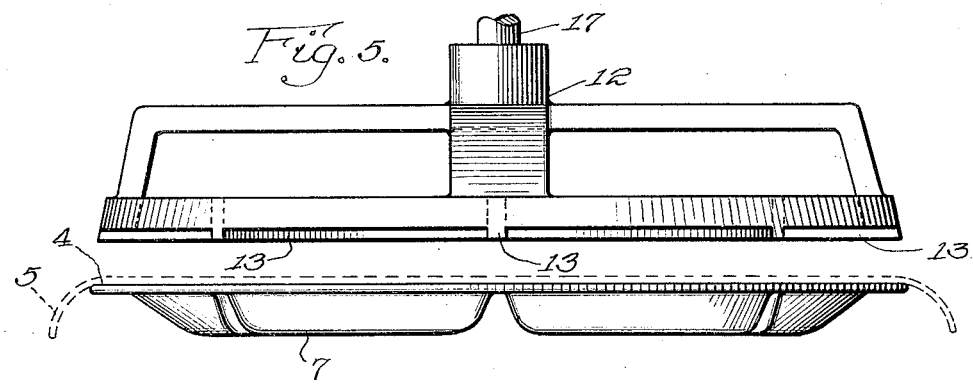
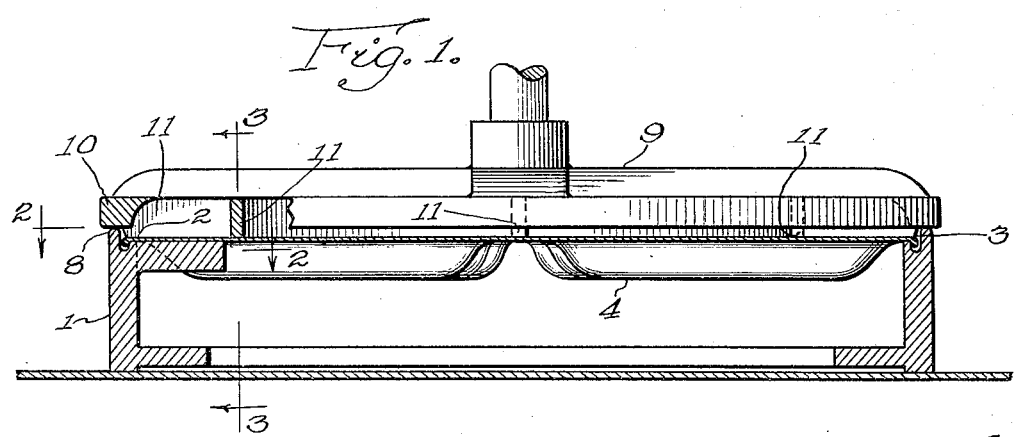
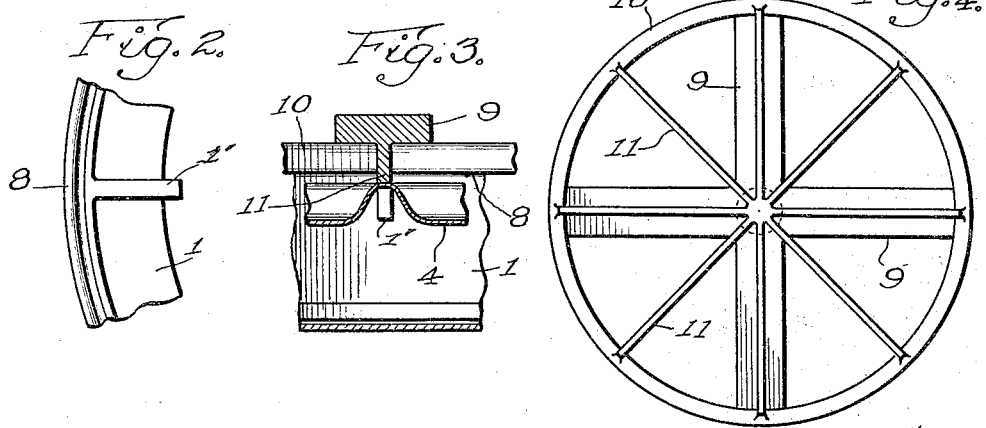
Witness
Arthur W. Franke
Inventor
Dennis W. Smith Aug. 16, 1932.   D. W. SMITH   1,871,755
PIE SEPARATING AND TRIMMING MECHANISM
Filed July 15, 1931   2 Sheets-Sheet 2
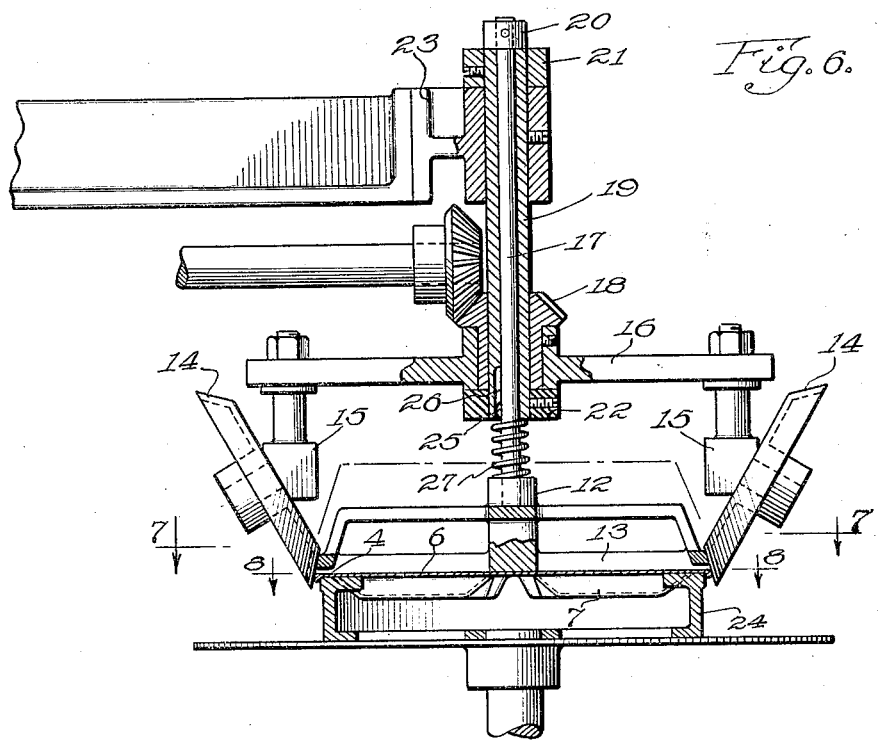
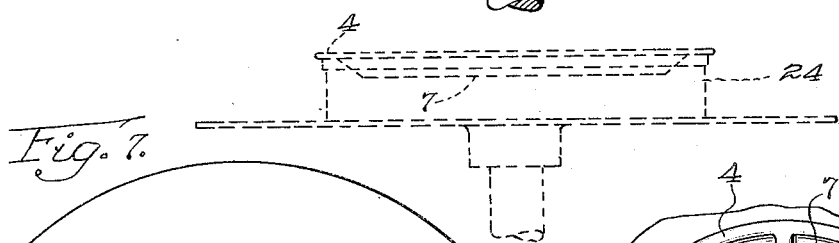
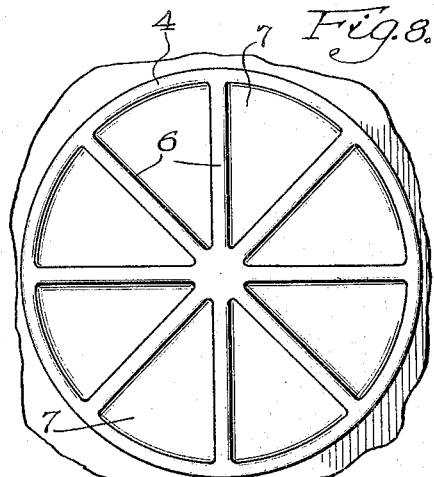
Inventor
Dennis W. Smith.

Patented Aug. 16, 1932

1,871,755

UNITED STATES PATENT OFFICE

DENNIS W. SMITH, OF WILMETTE, ILLINOIS, ASSIGNOR TO COLBORNE MANUFACTURING CO., OF CHICAGO, ILLINOIS, A CORPORATION OF ILLINOIS

PIE SEPARATING AND TRIMMING MECHANISM

Application filed July 15, 1931. Serial No. 550,930.

This invention relates to mechanical improvements in pie separating and trimming means for pie machines of the general class described in applicant's Patents Nos. 1,725,835, of August 27, 1929; 1,595,428, of August 10, 1926; 1,595,427, of August 10, 1926; and patent to Oliver Colborne, No. 927,490, of July 19, 1909. Mechanism for performing similar work to the mechanism herein disclosed is described in applicant's copending application for patent, Serial No. 545,454, filed June 19, 1931.

The objects of the invention are to provide improved means for separating and trimming pies which are formed in circular radially partitioned pie plates for the purpose of producing a plurality of complete, individual, sector shaped pies; and to provide an improved pie plate holder for cooperating with the severing and trimming means.

These objects are accomplished by the constructions illustrated in the drawings, wherein:

Figure 1 shows in side elevation and partly in section one form of pie severing and trimming means and cooperating pie plate support.

Fig. 2 is a fragmentary view as indicated by the line 2—2 of Fig. 1.

Fig. 3 is a fragmentary sectional detail taken on the line 3—3 of Fig. 1.

Fig. 4 is a bottom plan view of a severing and trimming element shown in Fig. 1.

Fig. 5 shows in side elevation a slightly modified pie severing member, and a pie plate in position to be engaged by the severing means.

Fig. 6 is a side view partly in section, illustrating the construction shown in Fig. 5, with trimming rollers and gearing for driving the same.

Fig. 7 is a plan view taken on the line 7—7 of Fig. 6.

Fig. 8 is a plan view of a pie plate with which the severing and trimming mechanism is designed to cooperate.

The improved construction is designed for use in pie making machines wherein the pie plate holders may be reciprocated vertically relative to cooperating severing and trimming means, for the purpose of severing and trimming pies after other necessary operations are performed, such as properly placing the disk of dough which forms the lower crust of the pie, performing the filling operation, and the placing of the upper crust forming disk of dough.

The severing and trimming operation may be completely performed by a single element as illustrated by Fig. 1, or by means of a severing die in combination with rotary trimming rollers as illustrated by Fig. 6.

As illustrated in Fig. 1, the pie plate holder 1 is formed to provide a circular rest 2 for supporting a pie plate by engagement with the under side of a rim 3 of a pie plate 4. Pie plate 4 is of the usual circular kind except that it is divided by radial partitions 6 into a plurality of sector shaped pockets 7. The pie plate holder 1 is provided with lugs 1' for fitting within the upwardly pressed partition 6 of pie plates for the purpose of retaining pie plates on the holder in correct position for cooperation with pie severing means having radial severing elements corresponding with the partitions of the pie plate.

The dough forming the lower crust of the completed pies is indicated by broken lines 5, in Fig. 5. This disk is of greater diameter than the pie plates, and when a pie plate is placed upon the support 1, the dough 5, and also a similar disk shaped piece of dough forming the upper crust for the pies, extends over the annular rib 8 on the upper edge of the pie plate support 2. This rib being of greater diameter than the pie plate, allows for the crust being trimmed beyond the pie plate, so that shrinkage thereof when baking, will make the crust approximately the same diameter as the pie plate.

In order to trim the crust along the line of the rib 8, and at the same time sever the crust radially along the upper edge of the partitions 6 of the pie plate, a partitioning and trimming element 9 is provided. This member is wheel-shaped to provide an annular trimming portion 10 for cooperating with the annular rib 8 on plate support 1, and radial crust severing elements 11 for cooperating with the radial partitions 6 of the pie plate.

In order to divide the contents of the pie plates into sector shapes, and to simultaneously perform the crust trimming operation, either the member 9 is moved down against the pie plate support 1, or the latter is moved upwardly into engagement with the severing and trimming member 9.

In the construction illustrated by Figures 5 to 8 inclusive, the pies are divided into sector shapes by a severing member 12, similar to the member 9 shown in Fig. 1, in that it has radial severing ribs 13, but the trimming is performed by trimming rollers 14, Fig. 6. These rollers are supported for rotation by bearing elements 15 depending from the ends of an arm 16, which is centrally supported for rotation around the axis of a post 17 extending upwardly from the center of the severing member 12. The arm 16 is rotated by means of gear 18, to which the arm is secured. This gear rotates on a bearing sleeve 19 surrounding post 17. The post 17, the bearing sleeve 19, the gear 18, and the arm 16, are prevented from moving downwardly by collars 20, 21 and 22; all are supported by frame member 23.

The post 17 and the severing and trimming member 12 are non-rotatably supported within the bearing sleeve 19, which may have a slight upward motion to provide slight cushioning thereof when the pie plate holder 24 moves upwardly against the severing element 12. For this reason the post carries a key 25 extending into a vertical slot 26 in the bearing sleeve 19. A spring 27 resists this upward motion and serves to return the severing member 12 after each operation.

In performing the severing and trimming operation by means of the construction illustrated by Fig. 6, the pie plate holder 24 is moved upwardly from the dotted line position to the full line position as illustrated by Fig. 6. At the upper end of the stroke, the pies are divided and trimmed by engagement with the severing element 12, and the driven trimming rollers 14.

Although but two specific embodiments of this invention have been herein shown and described, it will be understood that certain details of the construction shown may be altered or omitted without departing from the spirit of this invention as defined by the following claims.

I claim:

1. Mechanism for separating and trimming sector shaped pies in single circular pie plates, comprising a relatively reciprocable plate holder and a severing and trimming member, said plate holder including an annular flange shaped to provide a rest for the rim of a pie plate, an annular rib surrounding and extending above the plane of said rest, said separating and trimming member including a ring shaped trimming surface for cooperating with said rib and having radially extending severing elements.

2. In pie making machinery, the combination with a pie plate holder of a pie separating and trimming element, means for producing relative motion toward and away from each other between said pie plate holder and the separating and trimming element, said trimming element comprising a circular rim and radial flanges extending from the rim to the center of said element, said pie plate holder including a circular rest for engagement with the rim of the pie plate, and a circular rim of larger diameter than said rest for cooperating with the rim of said separating and trimming element.

3. In pie making machinery, the combination with a pie plate holder having an annular flange forming a seat for the rim of a pie plate, a pie plate supported in said holder, said pie plate being divided by a plurality of partitions, a separating element having flanges corresponding with said partitions, said pie plate holder being arranged for reciprocation toward and away from said separating element, and a mounting for said separating element including a spring for cushioning said element when engaged by the pie plate on said holder.

4. In pie making machinery, the combination with a pie plate holder arranged for supporting circular pie plates, a pie plate in said holder, said pie plate being provided with a circular rim and a plurality of partitions arranged radially between the rim and the center of the plate, a separating element provided with radial flanges for cooperating with the radial partitions of the pie plate, and means on the pie plate holder cooperating with the partitions of the pie plate for retaining the pie plate in the correct position for having its radial partitions correspond with the radial flanges of the separating element.

Signed at Chicago, in the county of Cook and State of Illinois, this 13th day of July, 1931.

DENNIS W. SMITH.